United States Patent [19]
Budoff

[11] 3,897,882
[45] Aug. 5, 1975

[54] ROLL-OFF CONTAINER

[75] Inventor: Hyman Budoff, Akron, Ohio

[73] Assignee: Hybud Equipment Corporation, Akron, Ohio

[22] Filed: Apr. 16, 1974

[21] Appl. No.: 461,362

[52] U.S. Cl. .............................................. 214/517
[51] Int. Cl.[2] ............................................ B60P 1/64
[58] Field of Search .......... 296/35 A; 214/515, 516, 214/517, 38 D

[56] References Cited
UNITED STATES PATENTS

| | | | |
|---|---|---|---|
| 1,866,640 | 7/1932 | Fontaine | 214/517 X |
| 2,534,156 | 12/1950 | Wyatt et al. | 214/517 |
| 2,925,186 | 2/1960 | Anderson et al. | 214/517 X |
| 3,182,608 | 5/1965 | Mollon | 296/35 A X |
| 3,399,795 | 9/1968 | Clucker et al. | 214/517 |

*Primary Examiner*—Leo Friaglia
*Assistant Examiner*—R. Schrecengost
*Attorney, Agent, or Firm*—Mack D. Cook, II

[57] ABSTRACT

A reversible roll-off container for use with a truck chassis. The truck chassis has a rearwardly directed frame and means for hoisting and positioning a container thereon. The container has an improved frame engaging means thereon providing for bidirectional loading of the container and automatic securing or holding of the container on the truck during transport or unloading of the container contents.

2 Claims, 8 Drawing Figures

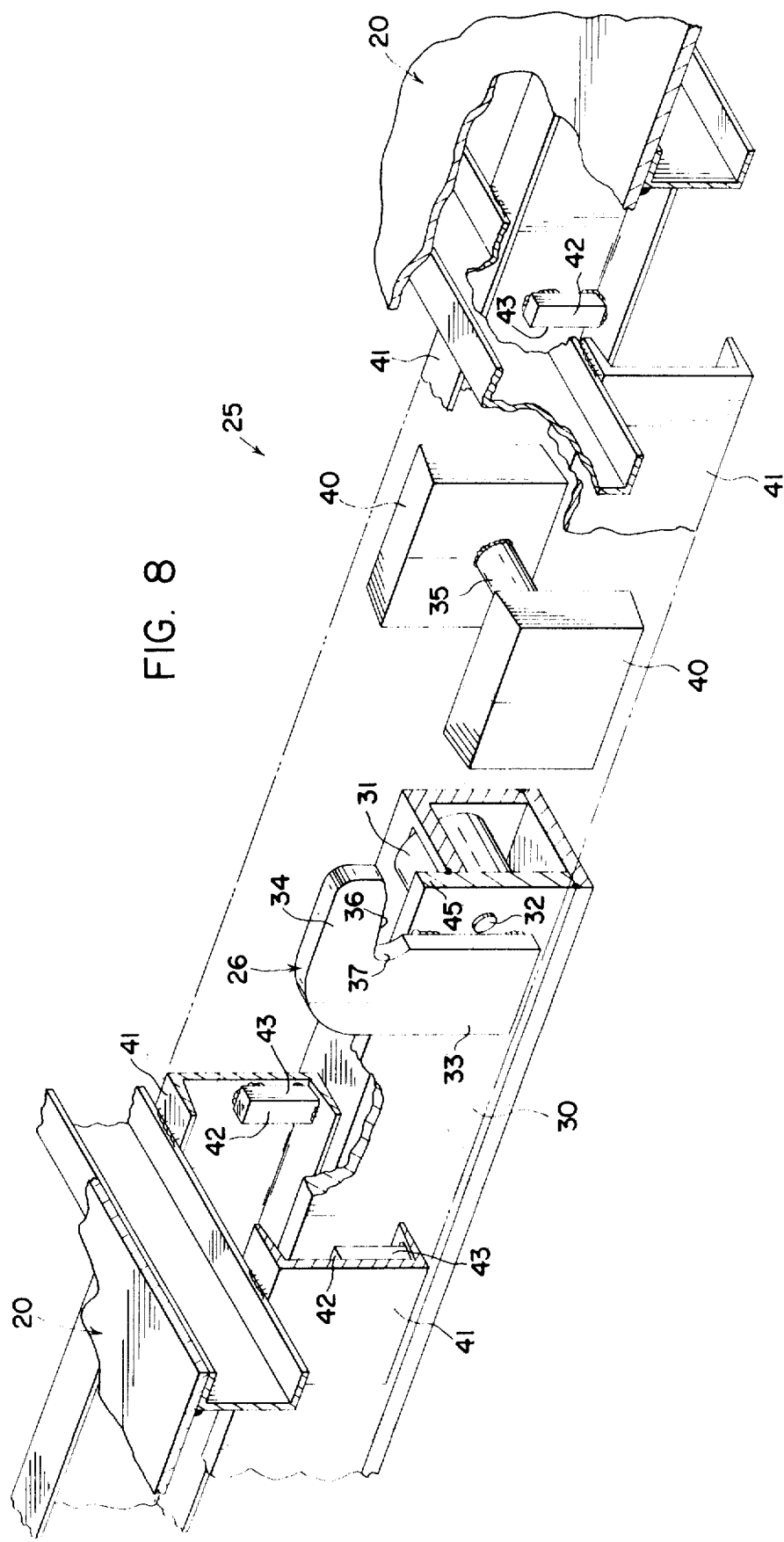

3,897,882

1

ROLL-OFF CONTAINER

BACKGROUND OF THE INVENTION

The invention relates to roll-off containers. More particularly, the invention relates to reversible roll-off containers for use with a truck chassis.

Roll-off containers are not new. Many types having various features and different sizes and shapes are in common use, including the storage and transportation of refuse. Furthermore, many containers are used with truck chassis having rearwardly directed frames and means for hoisting and positioning containers thereon. Some positioning means are even adjustable so as to accommodate containers of various length.

Containers having means for engaging a frame on a truck chassis are likewise old. However, known prior art containers using connector elements, such as pins, have heretofore been "unidirectional," requiring that the truck back up to a "front end" of the container in order to hoist and automatically properly secure the container thereon. In the event the container was approached from a "rear end," further adjustment was required to properly secure the container to the frame.

It has been found that the subject matter of the invention overcomes the disadvantage of unidirectional loading by providing a reversible roll-off container that can be hoisted onto the truck frame from either direction.

It has further been found that providing a roll-off container with a reversible or bidirectional loading capability will also provide improved automatic securing or holding of the container on the truck during transport of unloading of the container contents.

The prior patent art has been reviewed and U.S. Pat. No. 3,229,622, January 1966, French et al., U.S. Pat. No. 3,250,414, May 1966, Pioch and U.S. Pat. No. 3,507,410, April 1970, Liberman et al., have been selected as the most pertinent prior art. It has also been determined that the search field includes Class 214, including subclasses 41 and 302 and Class 100, including sub-classes 41, 214 and 229.

SUMMARY OF THE INVENTION

It is an object of the invention to provide an improved roll-off container for use with a truck chassis having a rearwardly directed frame with means for hoisting and positioning the container thereon.

It is a further object of the invention to provide a roll-off container with a reversible or bidirectional loading capability.

Still further, it is an object of the invention to provide for improved automatic securing or holding of the container on the truck during transport or unloading of the container contents.

These and other objects of the invention, and the advantages thereof, will be apparent in view of the description of a preferred embodiment, as set forth below.

In general, a roll-off container according to the invention is used with a truck chassis having a rearwardly directed frame will means for hoisting the container thereon, by engaging either end of the container. The forward end of the frame has a container positioning means for overlying engagement of the forward end of the hoisted container. The frame also has intermediate the ends thereof an upwardly projecting and rearwardly directed container engaging member. The underside of the container carries a frame engaging means.

The roll-off container frame engaging means according to the invention is an assembly having a connector element positioned on the underside of the container for captivation by a container engaging member on the frame. The connector element is movable relative to the container when in contact with the engaging member. The assembly also has forward and rearward stop elements spaced a predetermined distance apart to establish or define the maximum extent of connector element movement during hoisting and positioning of the container onto the truck frame.

DESCRIPTION OF THE DRAWINGS

FIG. 8 is a perspective view, broken away or fragmentary, showing elements of the assembly comprising the improved frame engaging means.

DETAILED DESCRIPTION OF THE INVENTION

Figure 1:
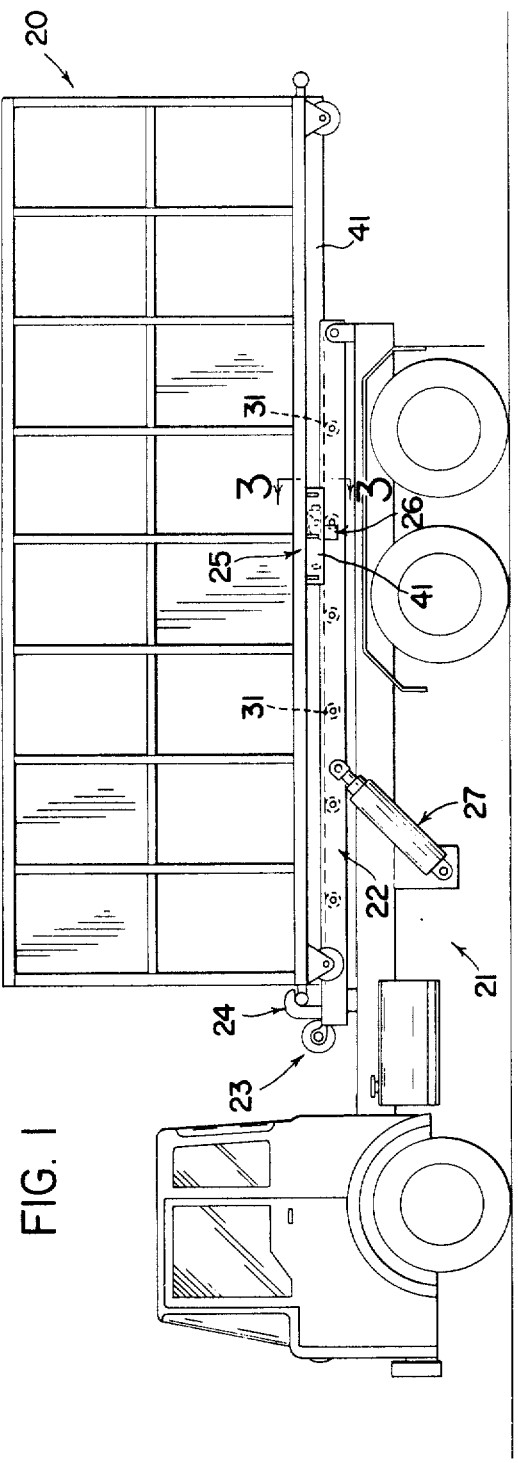
FIG. 1 is a side view of a roll-off container having an improved frame engaging means, according to the invention, and hoisted and positioned on the chassis of a truck, the container being longer than the truck frame.

According to the invention, a reversible roll-off container, indicated generally by the numeral 20, is used with a truck chassis, indicated generally by the numeral 21. The chassis 21 has a rearwardly directed frame, indicated generally by the numeral 22. The frame 22 has means thereon, indicated generally by the numeral 23, for hoisting a container 20 thereon by engaging either end of the container. The forward end of the frame 22 also has a container positioning means, indicated generally by the numeral 24, for overlying engagement with the forward end of the hoisted container 20.

The improved frame engaging means for a container 20 is an assembly referred to generally by the numeral 25. The assembly 25 coacts with a container engaging member, referred to generally by the numeral 26, on the frame 22 intermediate the ends thereof.

Figure 2:
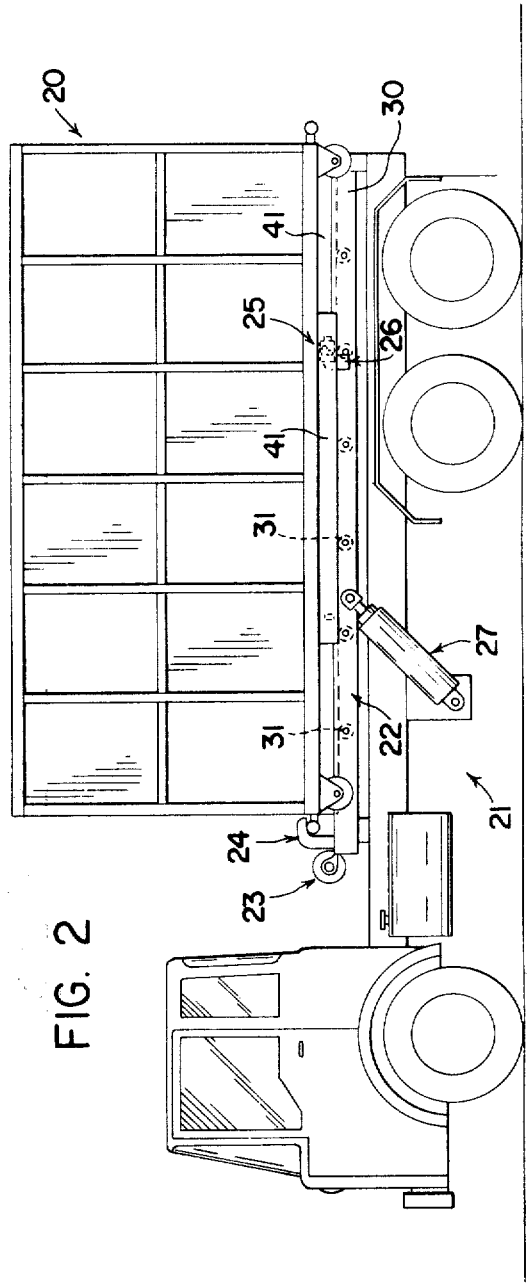
FIG. 2 is a similar view, the container having substantially the length of the truck frame.

As shown in FIGS. 1 and 2, the container 20 is used for transportation of refuse and so the frame 22 may be rearwardly inclined at a dumpsite, an end of the container (not shown) having been opened, by chassis mounted power means or cylinders, referred to generally by the numeral 27.

Figure 3:
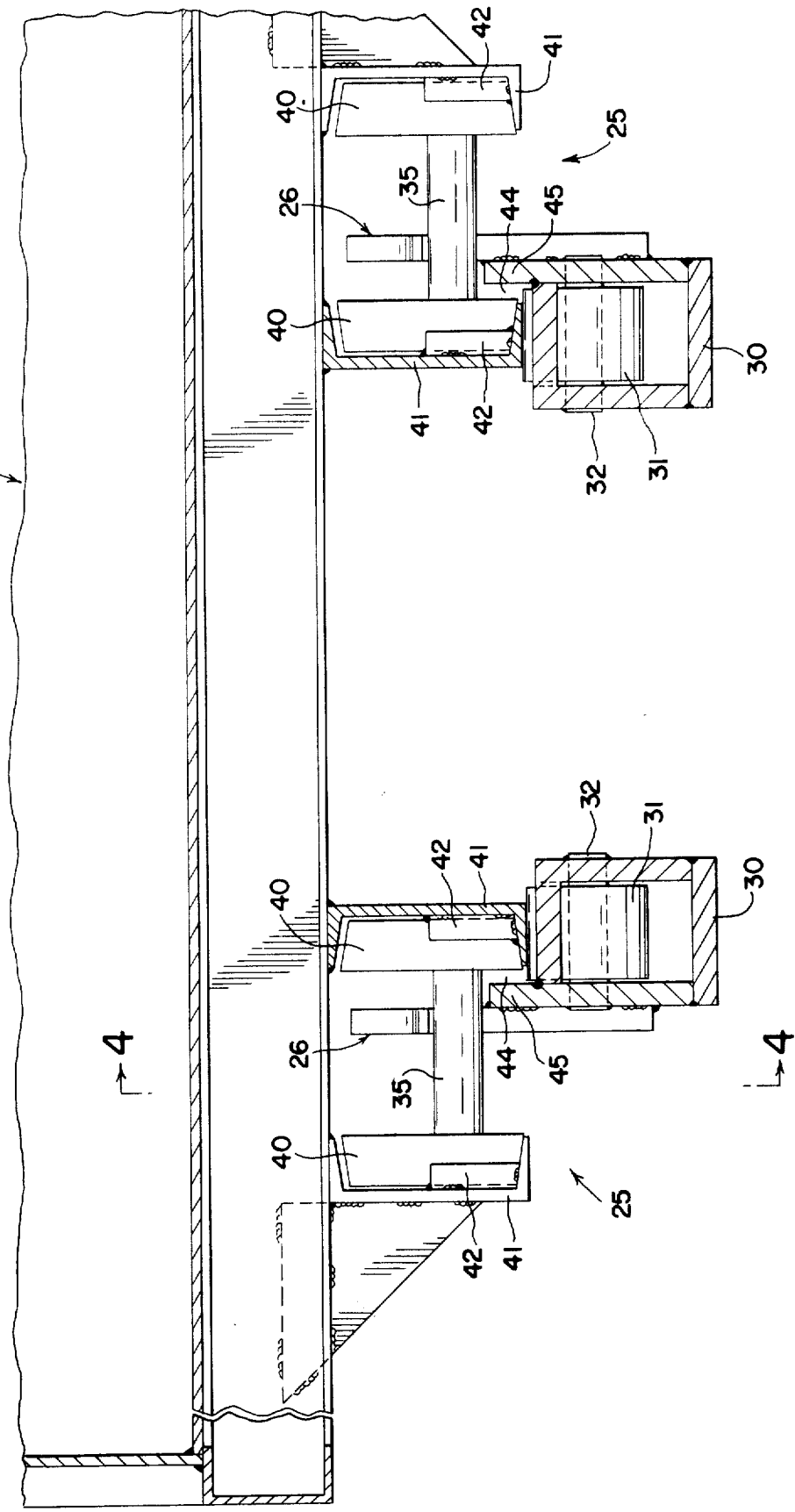
FIG. 3 is an enlarged sectional view, taken substantially as indicated on line 3—3 of FIG. 1, showing the improved frame engaging means according to the invention.

The frame 22 may be of conventional latticed welded beam and channel construction. As shown (see FIG. 3), the primary longitudinal components of the frame 22 are dual box beams 30. The box beams 30 may house a series of upwardly projecting rollers 31, mounted as on pins 32, for rolling movement of the container 20 thereon by the hoisting means 23.

As best shown in FIG. 8, the container engaging member 26 is attached, as by welding, to the outside face of box beam 30 intermediate the ends thereof. The exact location of the member 26 relative to the frame 22 is determined by at least two factors. As shown in FIGS. 1 and 2, a member 26 should be located away from the positioning means 24 a distance more than half the length of the longest container 20 to be loaded on a chassis 21. The attachment point for a member 26 should also be generally over the rear wheels on a chassis 21.

A member 26, which may be generally described as hook-shaped, has an upwardly projecting or shank portion 33 carrying a rearwardly directed or hook portion 34. The hook portion 34 is positioned above the upper side of the box beam 30 at a height so as to permit captivation of a connector element 35 of the frame engaging means 25. The underside of the hook portion 34 preferably has a surface 36 which is forwardly and downwardly tapered. The surface 36 also preferably terminates in a cove area 37 having a forward radius or configuration as determined by the configuration of the connector elements. Forward movement of the connector element 35 beneath the hook portion 34 and against the tapered surface 36 and into the cove area 37 will provide for automatic securing or holding of a container 20 on a frame 22.

As best shown in FIG. 8, each connector element 35 of a frame engaging means 25 is the primary component of an assembly including dual carrier blocks 40 for the element 35, dual channel beams 41 for guiding the carrier blocks 40, and stop elements 42 in the channel beams 41 for limiting movement of the carrier blocks 40.

Referring again to FIG. 3, each carrier block 40 is attached to one end of a transversely directed connector element 35 and is confined by and slidably moves within the inner face of a C-shaped channel beam 41. Each pair of opposed channel beams 41 is attached to and extends longitudinally along the underside of a container 20. Each pair of channel beams is spaced laterally apart so as to straddle a member 26 attached to a frame box beam 30. If desired, the inner of each pair of opposed channel beams 41 may be a longitudinal container component which rolls on the frame rollers 31.

Figure 4:
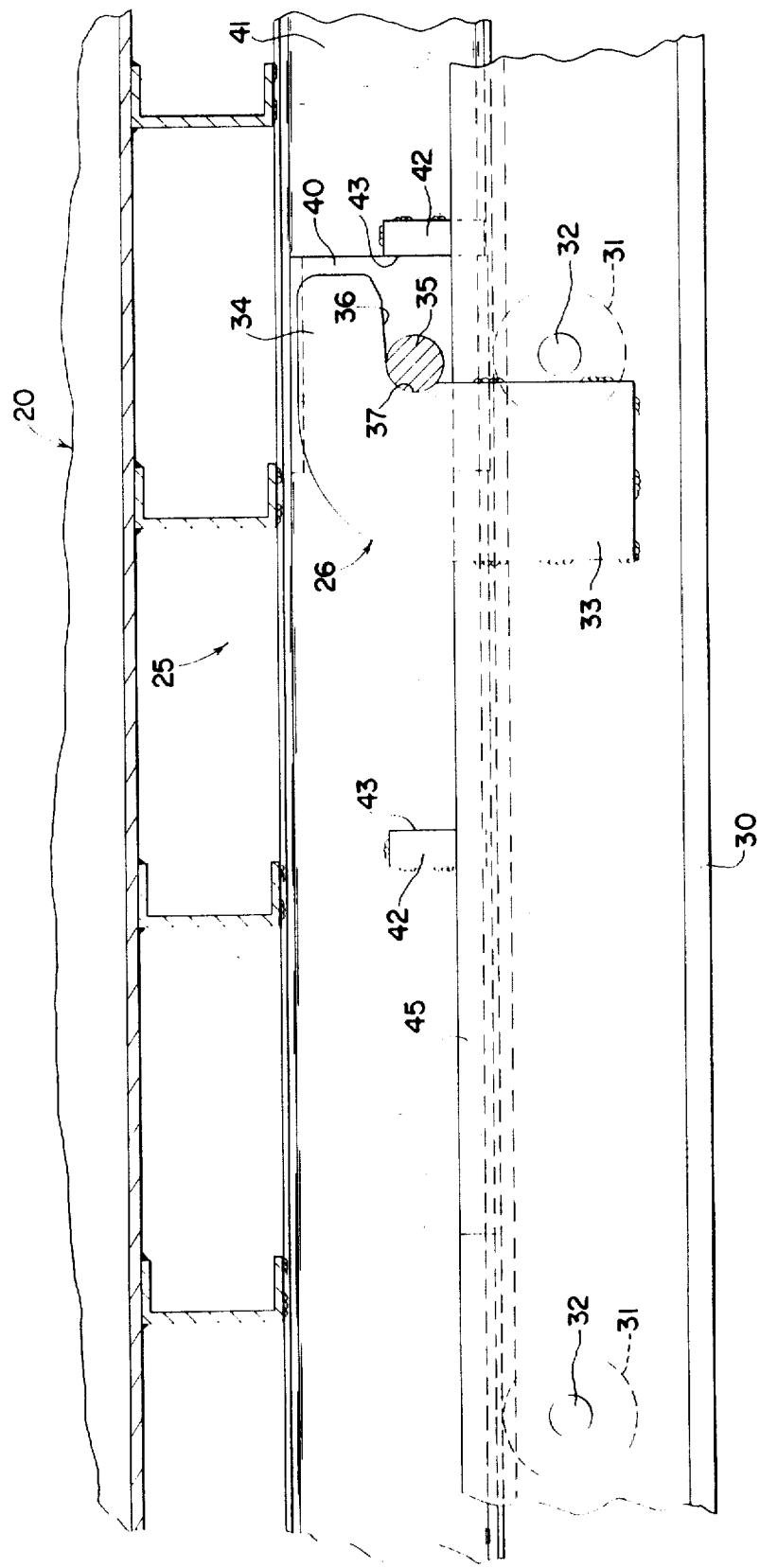
FIG. 4 is another sectional view taken substantially as indicated on line 4—4 of FIG. 3.

Referring now to FIG. 4, each stop element 42 is attached to the inner face of a channel beam 41. Each stop element 42 is positioned so as to provide a surface 43 to arrest or prevent further movement of a carrier block 40. The exact location of each stop element 42 is referenced from the opposite end of a container 20. The location is determined by computation of the distance between the forward radius of the cove area 37 of a container engaging member 26 and the forwardmost point on positioning means 24, which makes contact with a container end when a container 20 is hoisted and positioned on a frame 22. A stop element 42 is then positioned at a location such that when a carrier block 40 is placed rearwardly against a surface 43 on the stop element 42, the distance between the forwardmost points on a connector element 35 and the opposite end of a container 20 corresponds to the computed distance.

Figure 5:
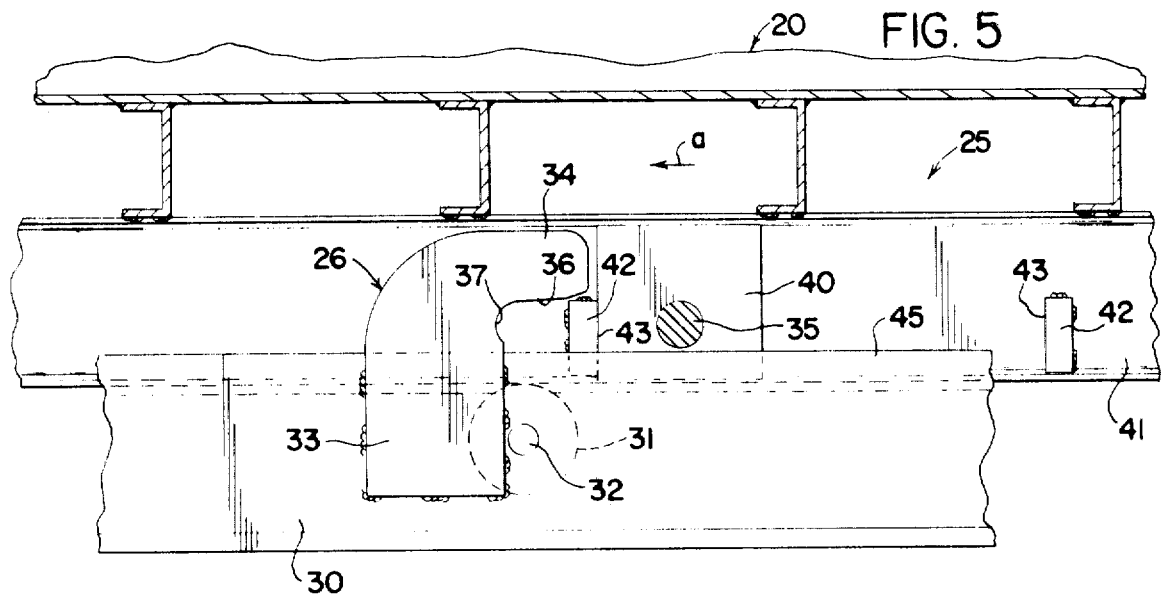
FIGS. 5-7 are views, similar to FIG. 4, showing a representative sequence of movements of the improved frame engaging means during hoisting and positioning of a container onto the truck frame.
Figure 6:
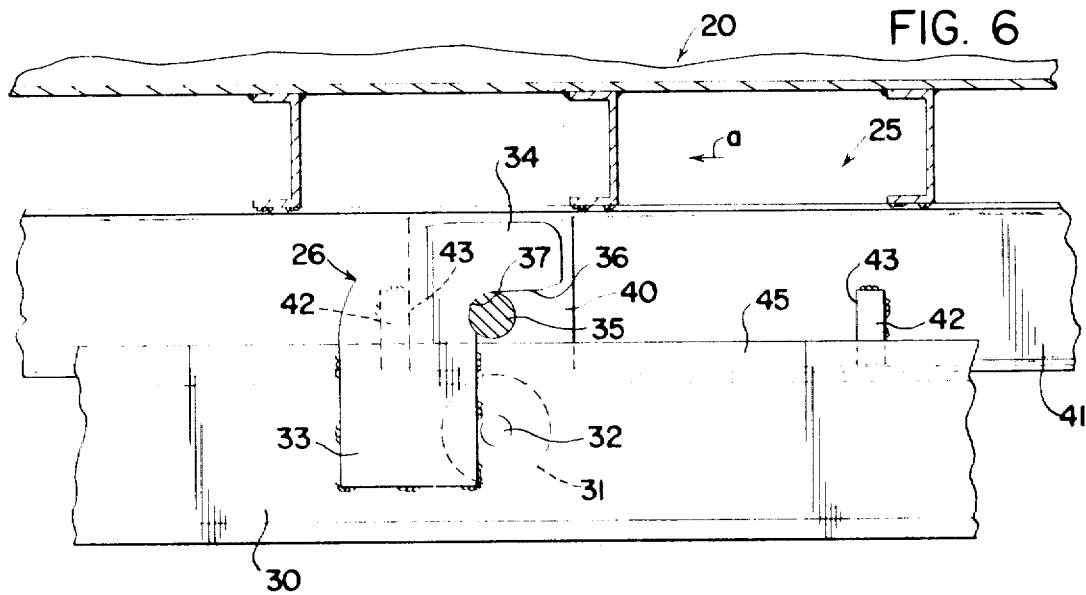
Figure 7:
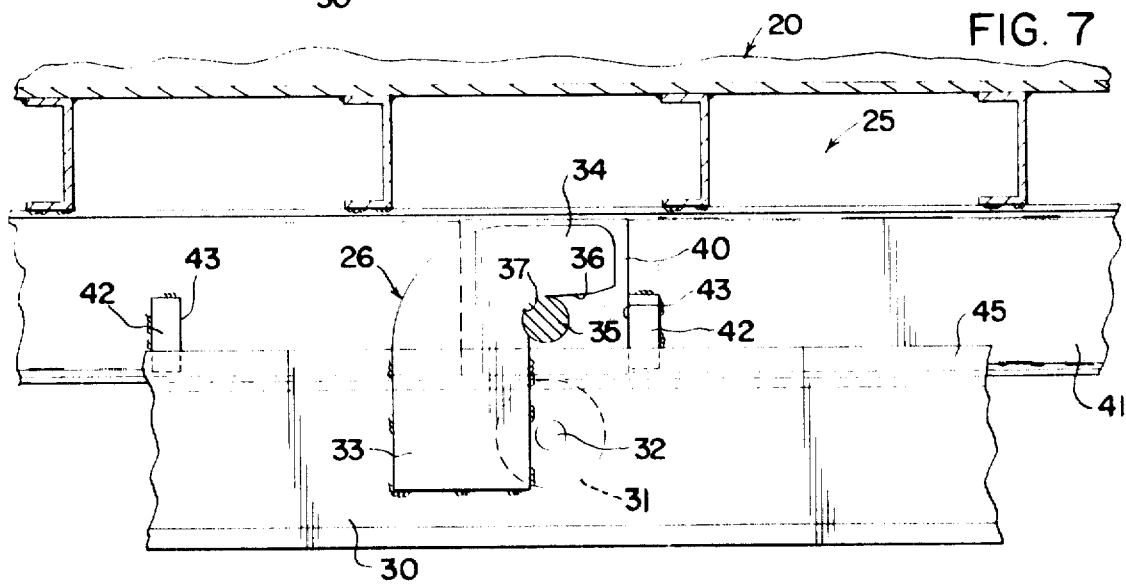

Referring not to FIGS. 5–7, a sequence of movements of a frame engaging means 25 according to a preferred embodiment of the invention is shown. With reference to FIG. 5, a container 20 is being hoisted onto a box beam 30 of a frame 22 (not shown) in the direction $a$. A carrier block 40 is shown as against a surface 43 of a forward stop element 42, a condition which would result from having previously hoisted the container 20 from the reverse end. The connector element 35 has not yet been drawn into contact with the member 26.

With reference to FIG. 6, the connector element 35 has been captivated by the member 26. The hoisting motion has caused the connector element 35 to move forwardly beneath the hook portion 34 and against the tapered surface 36 and into the cove area 37 of the member 26. The carrier block 40 is still positioned against a surface 43 of the forward stop element 42. Relative movement between the connector element 35 and the member 26 has ceased. The connector element 35 will now move relative to the container 20 until the container 20 is completely hoisted and positioned onto a truck frame 22 (see FIG. 7), that is, until the forward end of the container 20 is overlyingly engaged by a positioning means 24.

Referring now to FIG. 7, the captivated connector element 35 has moved rearwardly relative to the container 20. The carrier block 40 has slidably moved within the inner face of a C-shaped channel beam 41 and is now located against a surface 43 of a rearward stop element 42. In the event the connector element 35 is not fully captivated by the member 26 (as shown in FIG. 6), the connector element 35 will be driven into and held against the cove area 37 of the member 26 by the rearward stop element 42 simultaneously with the forward end of the container 20 being pulled by a hoisting means 23 into overlying engagement by a positioning means 24.

In FIG. 7, the hoisting operation is completed. A container 20 has been hoisted onto a truck frame 22 from the reverse direction as before and has been positioned thereon. Simultaneously therewith, the container 20 has been automatically secured or held thereon by the captivation of a connector element 35 by a member 26 and the positioning of a carrier block 40 against a rearward stop element 42.

In this position, forward movement of a container 20 on a frame 22 is prevented by a positioning means 24 and by a shank portion 33 of a member 26. Upward or rocking movement of a container 20 is restrained by a hook portion 34 of a member 26. Lateral movement of a container 20 is restricted to a clearance 44 (see FIG. 3) between a carrier block 40 and an upwardly projecting portion 45 of a box beam 30. Rearward movement of a container 20 is prevented by a hoisting means 23.

What is claim is:

1. A roll-off container for use with a truck chassis having a rearwardly directed frame with means of hoisting and positioning said container thereon, by engaging either end of said container, the forward end of said frame having a container positioning means for overlying engagement of either end of said container, said frame having intermediate the ends thereof an upwardly projecting and rearwardly directed container engaging member, the underside of said container carrying thereon a frame engaging means, characterized in that, said frame engaging means on said container is an assembly having a connector element positioned for captivation by said container engaging member on said frame, said connector element being transversely directed and having attached to each end thereof a carrier block which is slidably moveable relative to said container and confined within a channel beam attached to and extending longitudinally along the underside of said container, said assembly further having forward and rearward stop elements positioned within said channel beam to establish the maximum extent of the relative movement of said connector element.

2. The combination of claim 1 further characterized in that, said container engaging member has an upwardly directed portion and a rearwardly directed portion, said rearwardly directed portion having on the underside thereof a forwardly and downwardly tapered surface terminating in a cove area having a forward radius.

* * * * *